FIG. I

INVENTOR
RAYMOND L. COSS M.D
BY
Charles L. Lovercheck
attorney

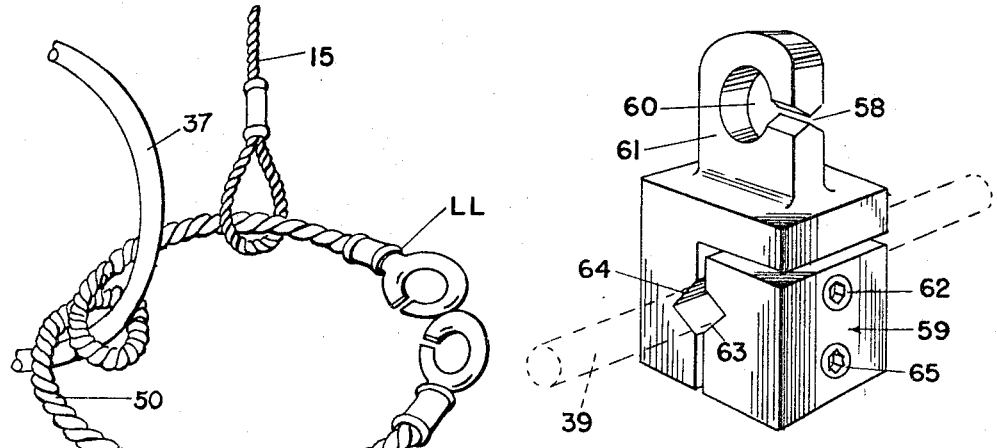
FIG. 2
FIG. 3
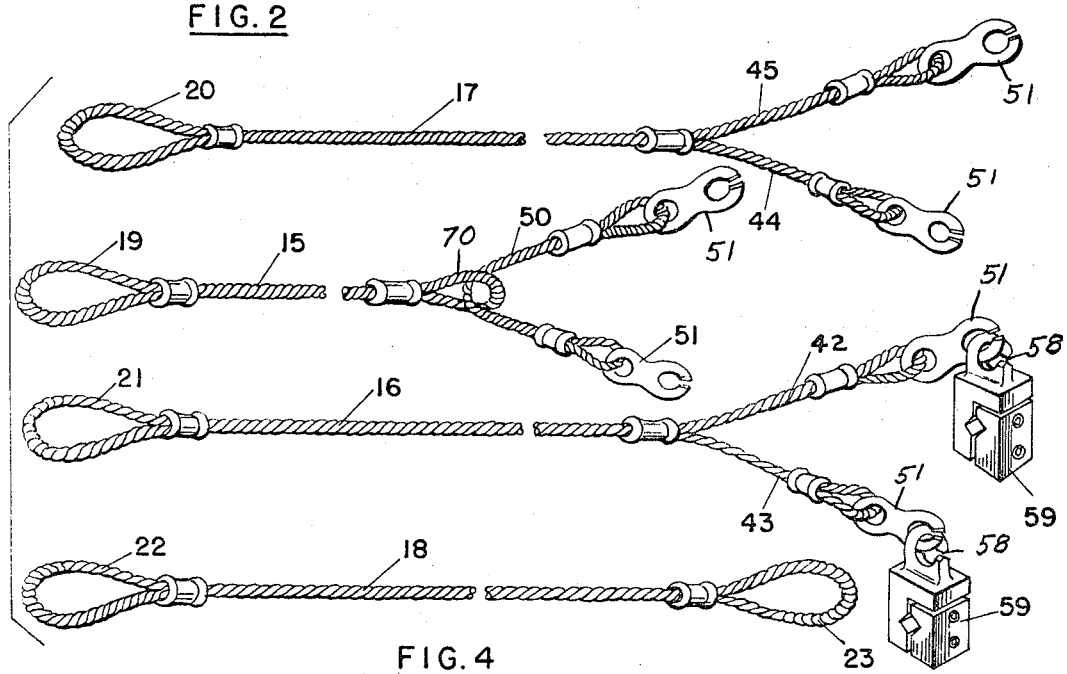
FIG. 4
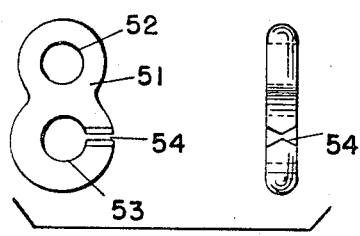
FIG. 5
RAYMOND L. COSS M.D
INVENTOR.
RAYMOND COSS M.D.
BY Charles L. Lovercheck
attorney 3,431,904
ORTHOPEDIC TRACTION APPLIANCE
Raymond L. Coss, 3503 Stoughton Road,
Erie, Pa. 16506
Filed Aug. 15, 1966, Ser. No. 572,531
U.S. Cl. 128—85   7 Claims
Int. Cl. A61f 5/04, 5/01

This invention relates to surgical equipment, and, more particularly, to a device and cable system for balanced traction suspension.

At present, the usual method of achieving balanced suspension or balanced suspension skeletal traction is accomplished through the use of ropes. With this method, knots must be tied, secured, and taped, and ropes must be cut to length. In addition, when the ropes are used once they must be discarded because if reused on a patient, fatigue, strain, breaking of the rope and dropping of the suspension equipment might result. There is considerable mess involved with rope ends and considerable personnel time involved in cutting the ropes to length and tying the knots, and securing the rope.

The purpose of the system disclosed herein is to provide a non-toxic, reusable, stable, sterilizable, rapidly attached, standard means for applying balanced traction suspension to a patient. Its characteristics are simplicity, dependability, speed, reusability, standardization, neatness, low friction as compared to rope, and capability of saving considerable funds for the hospital. The cable is kink resistant and non-toxic and should certainly be able to be used for years without replacement. The stability achieved with the below demonstrated quick disconnect system is far superior to the stability of the ropes that are presently used. The strength of the system is far greater than the rope system that we now use, but of most importance is the speed of application of this system measured in a time span of several minutes as compared with three-quarters of an hour to an hour with the conventional rope system. The cable can be sterilized and can be packaged in a form similar to that now used for the Levine tubes presently used in hospitals.

It is, accordingly, an object of the invention to provide an improved system for treating fractures.

Another object of the invention is to provide an improved surgical device.

Another object of the invention is to provide a surgical device which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 2 is a view of the attaching means;

FIG. 3 is a view of the attaching clamp;

FIG. 4 is a detailed view of the cables used in the invention; and

FIG. 5 shows a side view and front view of one of the quick disconnect elements.

Figure 1:
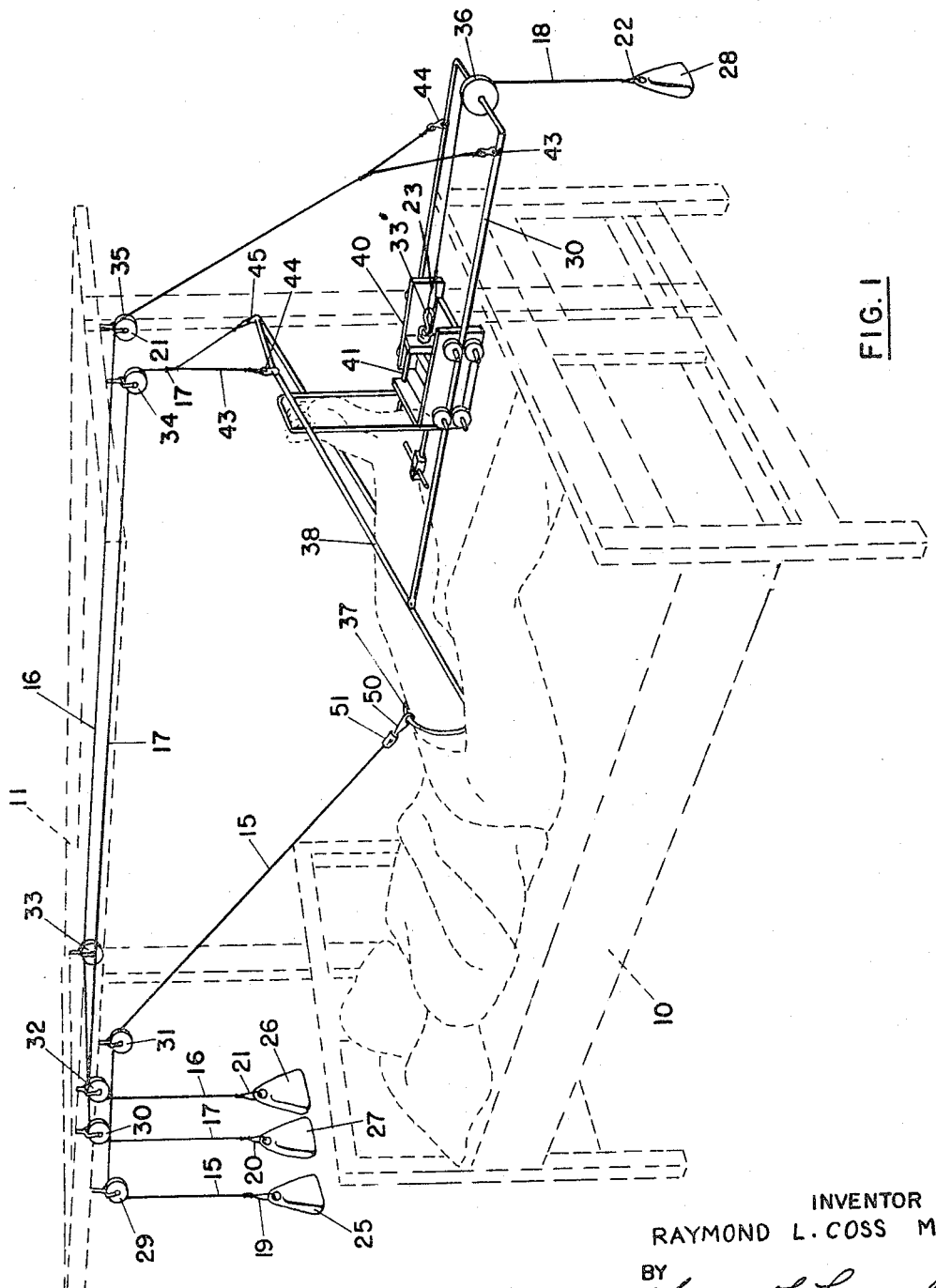
FIG. 1 is an outlined view of the surgical device according to the invention.

Now with more particular reference to the drawings, the cable system to be described below is universally applicable to all patients in balanced traction suspension or in balanced suspension.

Five cables are elements of the invention. These cables are cables 15, 16, 17, 18, and 50. All of these cables are made of high strength material such as stainless steel. The cables 15, 16, 17, and 18 each have a loop 19, 21, 20, and 22, respectively, formed on one end by turning the cable back on itself and clamping it permanently by means of a suitable anchoring device.

The ends of each of the cables 16 and 17 opposite their respective loops terminate in bifurcated portions which are formed by two legs, one of which is a continuation of the main body of the cable and the other is a short cable clamped by means of a suitable anchoring device, as shown.

The ends of the bifurcated legs of the cables 16 and 17 each have a quick disconnect member as shown in FIG. 5 in enlarged view by way of an example; however, these disconnect elements could be any suitable quick disconnect member.

The cables 15 and 18 terminate in loops on both ends. Cable 15 has loops 19 and 70 on its ends and cable 18 has loops 22 and 23, which are suitable to receive their respective elements. The loop 70 of cable 15 receives the short cable 50 having the quick disconnect elements 51 on the ends of its legs. Cables 16 and 17 also have quick disconnect connectors 51 on their legs. The loop 23 receives the hook 33' on the trolley 40 as shown. The quick disconnect elements 51 are formed from an integral casting having an eye 52 in one end and a hook 53 in the other. The ends of hook 53 form a slot 54 with the terminal end of the body of the element 51 as shown. By forming the ends of hook 53 and the adjacent part wedge shaped as shown, they can be slipped into each other to interfit or they can be slipped into the slot 58 in the clamp member 59. The clamp member 59 has an eye 60 which can receive one of the quick disconnect members 51 and these terminal ends defining slot 54 in elements 51 can slide through the slot 58 in a well known manner.

These quick disconnect couplings are commercially available and are familiar to those skilled in the art.

The clamp 59 is made up of two parts: the L-shaped member with the eye member 61 integrally attached to the upper end thereof and the clamping member 62. Member 62 has a groove 63 similar to groove 64 in the L-shaped member. By tightening the set screw 65, the element 62 will clamp the Thomas splint 38 firmly and thereby positively locate the position of the cable thereon.

FIG. 1 clearly shows how the cables pass over the pulleys 29, 30, 31, 32, 33, 34, 35, and 36, and have weights 25, 26, 27, and 28 attached to the distal ends of cables 15, 16, 17, and 18, while the outer ends of the cables are atached to the elements of the device, as shown.

FIG. 2 shows how the cable 50 passes around the ring 37 of the Thomas splint and by passing it around the ring twice, the ring is prevented from rotating and rotation control of the fractured member is controlled.

By passing cable 50 about the ring 37 of the Thomas splint at least twice, control of rotation is obtained as well as secured grip on the ring 37 of the Thomas splint 38, which can allow a pulley adjustment to bring the ring 30 of the Thomas splint toward or away from the midline of the patient's body. It is to be noted that the yokes 41 and 43 are the elements that attach to the distal portion of the Pearson attachment 39 and the Thomas splint provides additional stability as concerns rotation of the Thomas splint Pearson attachment arrangement.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A traction device comprising a U-shaped traction unit, a U-shaped splint having a ring attached thereto, said traction unit being connected to said splint, said traction unit having a leg receiving member on one end thereof, and a metal cable adapted to be passed over a pulley on a hospital bed, said cable having a loop formed in the end thereof with a part of said loop passed around said ring at least twice, whereby said cable grips said ring when a force is exerted thereon.

2. Th device recited in claim 1 wherein a second cable is provided, a first end of said second cable having a bifurcated end terminating in two legs, said splint having two laterally spaced positions remote from said ring, each of said legs being attached to each said position.

3. The device recited in claim 1 wherein said traction unit has two laterally spaced positions on the end thereof remote from said splint, a third cable, said third cable terminating in a yoke having two spaced legs, each of said legs of said third cable being attached to said positions.

4. The device recited in claim 2 wherein said traction unit has two laterally spaced positions on the end thereof remote from said splint, a third cable, said third cable terminating in a yoke having two spaced legs, each of said legs being attached to said positions.

5. The device recited in claim 1 wherein said splint is a Thomas type splint.

6. The device recited in claim 1 wherein said traction unit is a Pearson type unit.

7. The device recited in claim 3 wherein a trolley unit is supported on said traction unit, and a fourth cable is attached at one end to said trolley and a roller is attached to the distal ends of said traction unit, said fourth cable passes over said roller, and a weight is attached to the distal end of said fourth cable.

References Cited

UNITED STATES PATENTS

| | | | |
|---|---|---|---|
| 1,347,396 | 7/1920 | Mulvany | 128—85 |
| 1,452,733 | 4/1923 | Garlock | 128—85 |
| 2,511,659 | 6/1950 | Wilson | 128—84 |

FOREIGN PATENTS

| | | |
|---|---|---|
| 132,444 | 5/1949 | Great Britain. |

L. W. TRAPP, *Primary Examiner.*